(12) United States Patent
Chabin et al.

(10) Patent No.: US 6,324,870 B1
(45) Date of Patent: Dec. 4, 2001

(54) METHOD AND DEVICE FOR INTEGRATING A GLASS PART AND METAL PART

(75) Inventors: Eric Chabin, Montigny-le-Bretonneaux; Emile Gabbay, Paris, both of (FR)

(73) Assignee: GE Medical Systems S.A. (FR)

( * ) Notice: Subject to any disclaimer, the term of this patent is extended or adjusted under 35 U.S.C. 154(b) by 0 days.

(21) Appl. No.: 09/364,956

(22) Filed: Jul. 30, 1999

Related U.S. Application Data

(63) Continuation of application No. PCT/FR98/02540, filed on Nov. 26, 1998.

(30) Foreign Application Priority Data

Dec. 1, 1997 (FR) .................................................. 97 15093

(51) Int. Cl.$^7$ ............................. C03C 27/02; C03C 29/00
(52) U.S. Cl. ............................. 65/154; 65/59.1; 65/59.2; 65/59.26; 65/59.27; 65/59.28; 65/155
(58) Field of Search .................................. 65/59.1, 59.2, 65/59.26, 59.27, 59.28, 154, 155; 285/238, 911; 205/664; 29/282, 592.1, 862, 896.8, DIG. 37

(56) References Cited

U.S. PATENT DOCUMENTS

| | | | |
|---|---|---|---|
| 1,293,441 | * | 2/1919 | Houskeeper . |
| 1,294,466 | * | 2/1919 | Houskeeper . |
| 1,716,140 | * | 6/1929 | Kirwer . |
| 1,812,489 | * | 6/1931 | Kruger . |
| 2,010,145 | * | 8/1935 | Eitel . |
| 2,057,452 | | 10/1936 | Scott ........................................ 49/92 |
| 2,271,657 | * | 2/1942 | Miller . |
| 2,336,488 | * | 12/1943 | Litton ..................................... 65/154 |
| 2,457,144 | * | 12/1948 | Goodale . |
| 2,640,167 | * | 5/1953 | Atlee et al. . |
| 3,203,715 | | 8/1965 | Benbenek .............................. 285/238 |
| 3,417,274 | * | 12/1968 | Bennett et al. . |
| 4,437,215 | * | 3/1984 | Nozue et al. . |
| 4,523,578 | | 6/1985 | Sabet ................................... 126/443 |

FOREIGN PATENT DOCUMENTS

| | | | |
|---|---|---|---|
| 170114 | * | 1/1952 | (AT) ..................................... 65/59.2 |
| 954150 | | 12/1949 | (FR) . |
| 183915 | * | 7/1966 | (SU) ..................................... 65/154 |

OTHER PUBLICATIONS

Dalton, Robert, "How to Design Glass-to-Metal Joints", Product Engineering, pp. 62–71, Apr. 1965.*

Patent Abstracts of Japan, vol. 012, No. 467, JP 63–185844, Dec. 7, 1988.

* cited by examiner

*Primary Examiner*—Michael Colaianni
(74) *Attorney, Agent, or Firm*—Jay L. Chaskin

(57) ABSTRACT

Metal collar device of the type used for integrating a glass part and a metal part of different coefficients of expansion. The collar is circular and comprises a first portion intended to be in contact with the metal part, a second portion intended to be in contact with the glass part and a bonding portion placed between said first and second portions. The second portion is not as thick as the first portion and as the bonding portion, so that it can adjust to the expansion of the glass part by exerting stresses on the latter below the limit of resistance of said glass part.

12 Claims, 1 Drawing Sheet

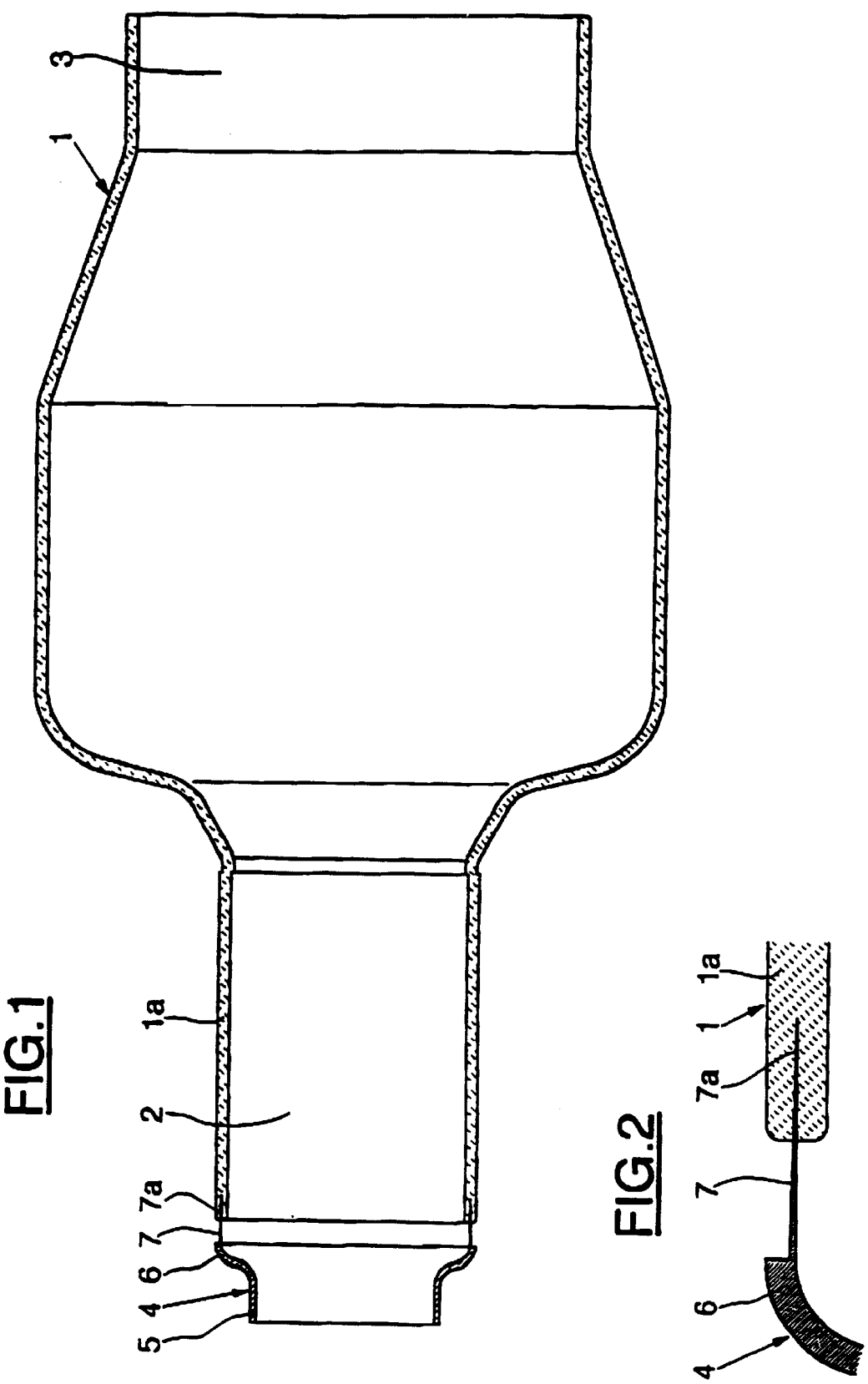

METHOD AND DEVICE FOR INTEGRATING A GLASS PART AND METAL PART

This is a continuation application of International Application No. PCT/FR98/02540 filed Nov. 26, 1998.

BACKGROUND OF THE INVENTION

The present invention concerns metal-glass bonding, particularly when these two materials possess different coefficients of expansion.

In electromagnetic radiation devices, notably X-ray tubes, such bonds are used to permit the passage of electric conductors through the glass walls of an X-ray tube, in order to connect the cathode and anode of the X-ray tube to an electric power source. In fact, the cathode and anode are placed inside a glass wall and are kept under vacuum. The junction between the electric conductors and the glass panel must therefore be tight.

In a known manner, it is possible to use a glass tube, for example, one made of glass manufactured by the SCHOTT company under Nos. 8245 and 8250, sealed with a collar made of Kovar (iron-nickel-cobalt alloy), the thermal expansion coefficients of which are similar. These materials are therefore suited to use in an X-ray tube whose temperatures varies widely, from room temperature to approximately 450° C. However, the cost of such a glass tube is very high.

A Pyrex® tube and a Kovar collar can also be used. Pyrex® and Kovar possess different coefficients of expansion, a progressive junction is produced by means of a succession of types of glass having coefficients of expansion which vary from that of Kovar to that of Pyrex®, such as SCHOTT's 8447, 8448, 8449 and 7740 types of glass.

The Pyrex® tube is therefore equipped at its end bonded to the Kovar collar with a plurality of rings of these different types of glass. It is easily understandable why manufacture of such a Pyrex® tube is very expensive.

BRIEF SUMMARY OF THE INVENTION

The present invention is intended to remedy the disadvantages of the above-mentioned devices by proposing a collar device capable of being bonded to glass part of different coefficient of expansion.

The invention is also intended to provide a collar to be fitted to a Pyrex® part.

The metal collar device is of the type used for integrating a glass part and a metal part of different expansion coefficients. The collar is cylindrical and comprises a first portion intended to be in contact with the metal part, a second portion intended to be in contact with the glass part and a bonding portion placed between said first and second portions. The second portion is not as thick as the first portion and as the bonding portion, so that it can adjust to the expansion of the glass part by exerting stresses on the latter below the limit of resistance of said glass part. An inexpensive glass part can thus be used without risk of breakage during temperature variations.

In one embodiment of the invention, the thickness of the second portion is less than one-tenth the thickness of the first portion and of the bonding portion. The second portion is thus considerably more flexible than the first portion and the bonding portion.

The second portion is advantageously beveled, the free end of the second portion being roughly 10 microns thick.

In another embodiment of the invention, the second portion is less than 200 microns thick.

The second portion advantageously possesses an angle roughly equal to 1° from the axis of the collar. The collar can be made of stainless steel, for example, of 304L type.

The invention also concerns an electromagnetic radiation device, for example, an X-ray tube, comprising a glass tube, a cathode and an anode, the anode comprising an electric conductor provided with a bond on the outside of the tube. The electromagnetic radiation apparatus includes a collar, such as previously described, placed between the glass tube and the bond. The tube is preferably made of Pyrex®. This results in a cost reduction of the tube equipped with its collar by a factor in the order of 50% to 70%.

The invention also concerns a method of manufacture of a circular collar comprising a first portion intended to be in contact with a metal part, a second portion intended to be in contact with a glass part and a bonding portion placed between the first and second portions.

The method comprises the following steps:

forming by stamping of the first and second portions and of the bonding portion of the collar, machining of the second portion in order to give it a bevel with a 1° angle, and electrolytic polishing of the second portion.

A further step of oxidation of the surface of the second portion of the collar is provided, which makes it possible to improve integration of the collar and glass part. This integration is carried out by steps of constant heating of the glass part, followed by axial insertion of the collar into one end of the glass part of the same diameter as the collar.

The second portion thus penetrates the thickness of the glass, which ensures tightness between the collar and the glass part. Electrolytic polishing of the second portion makes it possible to reduce its thickness, thereby reducing accordingly the stresses exerted on the glass part by the second portion upon temperature variations.

In the invention, the costs of manufacture of a glass part in tight contact with a metal part are reduced considerably, while guaranteeing satisfactory tightness and strength in a wide temperature range.

BRIEF DESCRIPTION OF THE DRAWINGS

The present invention will be better understood and other advantages will emerge from the detailed description of an embodiment taken nonlimitatively and illustrated by the attached drawings, wherein:

FIG. 1 is a view in axial section of an X-ray tube equipped with a collar; and

FIG. 2 is a view in detail of FIG. 1.

DETAILED DESCRIPTION OF THE INVENTION

As can be seen in the figures, part 1 has a circular shape, comprising a first open end 2 and a second open end 3. The first open end 2 is intended to receive a rotating anode not represented, which comes in the form of a rotary surface plate driven in rotation by an electric motor, whose rotor is placed in a cylindrical portion 1a of part 1 and whose stator is placed arranged around said cylindrical portion 1a. The second open end 3 is designed to receive a cathode not represented.

The open end 2 of part 1 is integrated with a collar 4 by a method to be described below.

The collar 4 is made of stainless steel, 304L type stainless steel, for example. The collar 4 comprises a first cylindrical portion 5, a second portion 7 designed to be in contact with part 1 and a bonding portion 6 placed between the first portion 5 and the second portion 7. The first portion 5 is intended to be tightly integrated, by soldering, for example, with a metal element, not represented, securing the electric bond between the anode and electric power means of the anode placed outside the glass part 1. The diameter of the first portion 5 of the collar 4 is adapted to that of the bonding element. Integration by soldering ensures perfect tightness between the collar 4 and the bonding element, which constitutes a considerable advantage over the collar made of hard-to-solder Kovar alloy.

The collar 4 is fabricated from a stainless steel tube formed by stamping, which provides its general shape. Then, the second portion 7 of the collar 4 is machined so as to reduce its thickness and give it a bevel with an approximate 1 angle. Finally, the second portion 7 undergoes electrolytic polishing in a sulfophosphoric bath, which has the effect of further reducing the thickness of said second portion 7 and of obtaining a free end 7a of said second portion 7 that is extremely thin, in the order of 10 microns.

A second portion 7 is thus obtained with a maximum thickness less than one-tenth the thickness of the first portion and bonding portion, that is, less than 200 microns thick. The free end of the second portion 7 is extremely thin, which facilitates its subsequent sealing with part 1. The collar then undergoes heat and chemical treatments, notably, a surface oxidation treatment of the second portion 7, which improves the subsequent sealing of metal and glass by capture of oxygen atoms in the voids of the glass.

The collar 4 thus obtained is ready for sealing with the open end 2 of part 1. Part 1 is heated at high temperature to make the glass pasty. The collar 4 is presented coaxially to part 1 with its second portion 7 directed toward the open end 2. Then, by axial displacement of the collar 4, the second portion 7 is driven into the glass at the open end 2 of part 1, the second portion 7 and the open end 2 being of the same diameter.

As can be seen, in particular, in FIG. 2, the second portion 7 is inserted in the glass in such a way that there will be an equal thickness of glass on both sides of said second portion 7, in order to ensure maximum strength of the glass part 1. The glass part 1 equipped with the collar 4 is then cooled, without risk of breaking of the glass, by reason of the different expansion of the stainless steel constituting the collar 4 and of the Pyrex constituting part 1, thanks to the capacity of the second portion 7 to be deformed because of its slight thickness, without exerting excessive stress on part 1.

The cathode is sealed with the glass part 1, which is then evacuated for a satisfactory propagation of the electromagnetic radiation and of X-rays, in particular. Sealing of the anode and cathode must therefore be tight and, moreover, withstand strong temperature variations. When it is off, the glass part 1 is at room temperature, and, in operation, it can reach a temperature of approximately 450° C. Sealing of the anode and cathode must therefore remain strictly in that temperature range.

Thanks to the invention, it is possible to seal together an inexpensive Pyrex tube and a stainless steel collar 4, which can be easily soldered to a bonding element made, for example, of copper-aluminum alloy, ensuring excellent cooling of the anode, but very difficult to solder with Kovar.

The invention is applicable, of course, to all types of metal collars intended to be sealed with a glass part of different expansion coefficient.

Various modifications in structure and/or steps and/or function may be made by one skilled in the art to the disclosed embodiments without departing from the scope and extent of the invention.

What is claimed is:

1. A metal device for integrating a glass part and a metal part of different coefficients of expansion, the device comprising a first portion intended to be in contact with the metal part, a second portion intended to be in contact with the glass part and a bonding portion placed between said first and second portions, wherein the second portion is not as thick as the first portion and is not as thick as the bonding portion, so that it can adjust to the expansion of the glass part by exerting stresses on the latter below the limit of resistance of the glass part and wherein the thickness of the second portion is less than one-tenth the thickness of the first portion and less than one-tenth the thickness of the bonding portion.

2. A device according to claim 1, wherein the second portion is beveled, the free end of the second portion being substantially 10 microns thick.

3. A device according to claim 1, wherein the second portion is less than 200 microns thick.

4. A device according to claim 1, wherein the second portion has a bevel with a substantially 1° angle.

5. A device according to claim 2, wherein the second portion has a bevel with a substantially 1° angle.

6. A device according to claim 3, wherein the second portion has a bevel with a substantially 1° angle.

7. A device according to claim 1, wherein the device is made of stainless steel.

8. A device according to claim 1, wherein the device is a circular collar.

9. Electromagnetic radiation apparatus comprising a glass tub anode, the anode comprising an electric conductor provided with a bond on the outside of the tube, comprising a device placed between the glass tube and the bond said device having a first portion in contact with said bond, a second portion in contact with said glass tube and a third portion between said first and second portions, said first and third portions each being thicker than said second portion whereby said second portion can adjust to the expansion of said glass tube and wherein said second portion is less than one-tenth the thickness of said first portion and less than one-tenth the thickness of said third portion.

10. A method of integrating a glass part and a metal part having different coefficients of expansion comprising the steps:

(1) forming a device for integrating the metal part and glass part by:
 (a) forming, a first portion of said device for contacting said metal part;
 (b) forming, a second portion of said device for contacting said glass part;
 (c) forming, a bonding portion of said device for bonding said first and second portions;
 (d) machining said second portion to give it a bevel with a 1° angle;
 (e) electrolytically polishing said second portion; and, (2) constant heating the glass part and axially inserting said second portion of the device into one end of the glass part of the same diameter as the device.

11. The method according to claim 10, comprising a further step of oxidizing the surface of the second portion of the device.

12. The method of claim 10 wherein the device is a circular collar.

* * * * *